Figure 1:
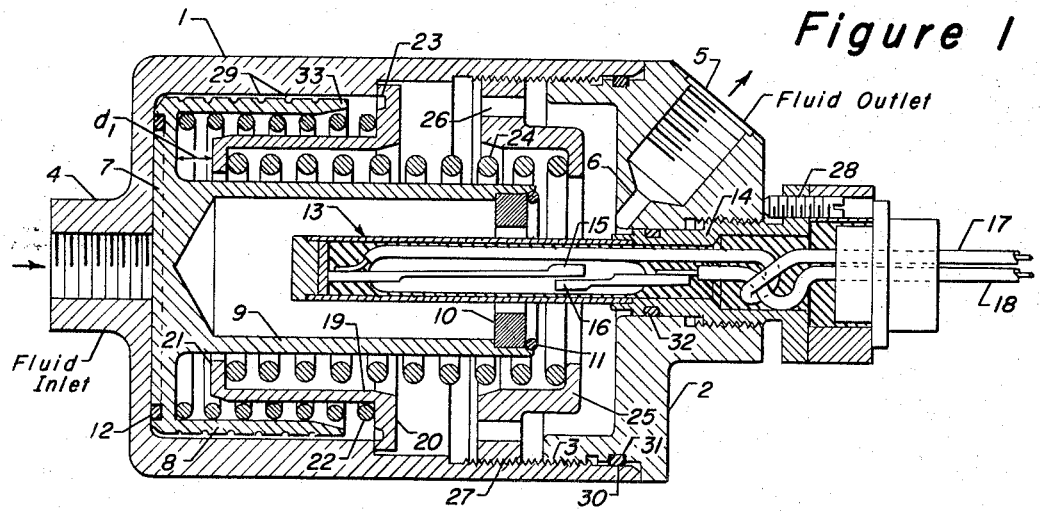

Sept. 19, 1967    T. R. BREUNICH    3,342,959

DIFFERENTIAL PRESSURE SWITCH

Filed Dec. 8, 1965

INVENTOR:
Theodore R. Breunich

BY: *James R. Hoatson Jr.*
*Philip S. Liggett*
ATTORNEYS

United States Patent Office 3,342,959
Patented Sept. 19, 1967

3,342,959
DIFFERENTIAL PRESSURE SWITCH
Theodore R. Breunich, Stamford, Conn., assignor to Universal Oil Products Company, Des Plaines, Ill., a corporation of Delaware
Filed Dec. 8, 1965, Ser. No. 512,322
5 Claims. (Cl. 200—83)

The present invention relates to an improved form of differential pressure switch that is operative to provide a signal, or open circuit, for pressures below and above a safe predetermined pressure range.

More particularly, the present differential pressure switch design utilizes a special form of movable piston, two different force balancing springs, and an electromagnetic-switch in a combined arrangement effecting an opening and closing of a circuit responsive to the extent of movement of the piston member and an attached magnet. The piston, in turn, being moved in the unit responsive to changes in fluid pressure exerted thereupon.

There are many forms of pressure switch designs and operations and it is realized, of course, that certain prior art constructions have utilized electrical switching which embodies the use of magnetically operated "reed" switches or switch capsules, where at least one spring supported contact can be moved responsive to a magnetic field of appropriate strength. The present design incorporates a normally open electromagnetic relay or switch means into combination with a piston-compression spring arrangement, so that the resulting unit is especially adapted to sense two conditions of pressure and/or of fluid flow. In other words there will be a signal from: (1) a low pressure differential indicating a substantial absence of fluid flow in the processing unit being monitored, and (2) a high pressure differential, indicating that there is a downstream blockage of fluid flow in such unit.

It may therefore be considered an object of the present invention to provide a differential pressure switch which gives a signal, or modifies an electric circuit, to show a satisfactory operating range of pressure within a system being monitored, as well as shown, either a high pressure or low pressure differential, to in turn indicate that there is existent an abnormal and unsafe condition.

In one embodiment, it may be set forth that there is provided within the scope of the present invention, a pressure differential switch effecting an open circuit for pressures above and below a predetermined operating range, and comprising in combination, a confined tubular form pressure tight housing with a fluid inlet at one end thereof and a fluid outlet from the opposing end portion thereof, a movable piston member positioned in said housing in a manner having its solid transverse end portion adjacent the fluid inlet end of the housing, in addition said piston member having an outer peripherial wall section and a concentric spaced apart open inner core section, a ring-shaped intermediate spring holding member that is longitudinally movable in a position between said outer wall section and said inner core section of said piston member, said spring holding member having an outwardly projecting flange section providing support for a low pressure range compression spring positioned therebetween and the interior of said transverse end portion of said piston member, said spring holding member also having an inwardly projecting flange section supporting a high pressure range spring therebetween and a downstream interior end portion of the housing, a magnetically operable electrical switch capsule having overlapping normally open contact points, with at least one contact point spring supported, therein, and said switch capsule mounted within a central portion of said housing to extend into the interior of said inner core section of said movable piston member, and a magnet member attached at the downstream open end portion of said inner core section to move adjacent the exterior wall of said encased electrical switch unit, whereby an electrical contact is made between the contact points of said switch unit from the field of said magnet as it travels adjacent the contact point zone from the corresponding movement of said piston and conversely, whereby the circuit of said switch unit is broken as said piston carries the magnet both beyond and back away from the contact point zone of the switch resulting from both an increased pressure and from a decreased pressure on the piston member.

In the utilization of two compression springs for biasing a specially designed piston member, along with an intermediate spring holding member, there is provided an operation permitting the switch to be open when the piston is held "bottomed" or against the inlet end of the housing under zero differential pressure conditions; however, as the differential pressure increases and the piston moves, while pushing against the low range spring, there is a corresponding magnet movement until there is a reaching of a low pressure range set point and a closing of the switch contact points. At this point, there also may be engagement with the resistance of the high range compression spring where the differential pressure continues to increase and the piston continues to move against the engaged high range compression spring, with the low range spring being blocked out, then there may be an eventual reaching of the high differential pressure set point where the switch contact points open to again indicate an abnormal operating condition. Thus, as briefly noted hereinbefore, the switch unit can indicate an abnormal condition that is one of excessive pressure, where the piston carries the magnet beyond the zone of the contact points, or conversely, an abnormal condition where the piston has too small a differential pressure working against it and the compression springs can push the piston back to the inlet end and to a zone beyond the low set point of the desired pressure range.

A preferred design of the present improved differential pressure switch construction incorporates a "floating piston" arrangement which minimizes friction of the piston within the housing wall and substantially precludes misalignment or angular tilting of the piston as it travels longitudinally within the confined housing. Specifically, the preferred piston design provides for a relatively tight fit within the housing and for the machining of a helical groove to spiral around the outer wall of the piston for substantially the full length thereof. Such helical groove serves to lubricate the piston and at the same time provides a centering action within the housing itself.

Another feature of the present improved design is to have suitable seals at the two ends of the piston member and the compression springs mounted such that in the event of supply line failure to the switch unit, then the piston travels to the port that is opposite the failure and seals off either the inlet port or the outlet port, as the case may be, to prevent any loss of fluid.

It is also the feature of a preferred construction and arrangement to incorporate special adjustment means such that the pressure springs and switch operation can be closely adjusted so as to have the switch close and open for predetermined specified differential pressures. For example, the low set point may be adjusted by changing the longitudinal positioning of the reed switch. At the same time, the high pressure differential set point may be adjusted by the use of a separate movable high pressure spring support means within the downstream end of the housing, i.e., there may be changes in the spring loading as a result of position changes of such spring support member.

The design and arrangement of the present improved differential pressure switch, as well as further detail of the special advantageous centering and adjustment features of a preferred embodiment of the switch will be more apparent upon reference to the accompanying drawing and the following description thereof.

FIGURE 1 of the drawing is a diagrammatic sectional elevational view showing one form of the improved differential pressure switch.

FIGURE 2 of the drawing is again a sectional elevational view of the differential pressure switch, but with a changed position for the movable piston member and of the magnet held thereon, whereby the normally open contact points of the encased switch are indicated in a closed position.

Figure 3:
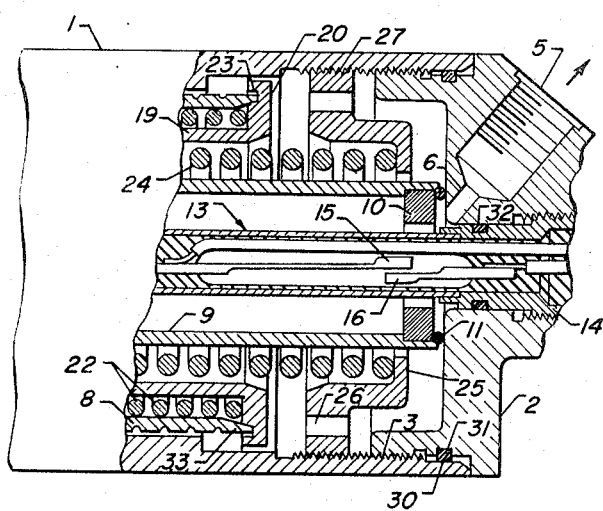

FIGURE 3 is a partial elevational view of the switch unit showing still another position for the piston member, where the piston and magnet have moved, by virtue of a high differential pressure, such that the magnetic field has permitted a breaking of the contact points in the switch capsule.

Referring now particularly to FIGURE 1 in the drawing, there is shown a housing 1 with a removable end portion 2 connected thereto by a threaded engagement at 3. A fluid inlet port 4 is shown in the end of the housing 1 while a suitable angularly positioned fluid outlet port 5 is shown from the opposing end of the housing, within the end section 2. A small bored passageway 6 provides communication between the outlet 5 and the interior portion of the confined housing.

Longitudinally movable within the housing 1 is a piston member 7 having an outer wall section 8 and a spaced, concentrically positioned, inner core section 9. The latter has shoulder means to support a ring magnet 10 as well as a downstream gasket seal or O-ring 11 which can provide for a relatively tight fluid seal against the inside face of the end housing section 2 whenever the excessive pressure against the piston is such as to cause to move to the extreme down-stream position. At the opposite end, on the inlet face of the piston 7 there is provided a suitable circular groove having a seal ring 12 such that at any time the fluid pressure to the switch unit is cut off for any reason, then the compression springs within the unit will hold the seal ring 12 against the interior inlet face of the housing 1 and preclude any fluid leakage back through the unit.

In connection with the force balancing springs for the piston 7, there is provided an intermediately positioned spring holding member 19 having an outwardly projecting flange 20 and an inwardly projecting flange 21. The outer flange 20 serves to support a downstream end portion of a compression spring 22 extending from the latter to the inside face of the piston 7. During the initial movement of the piston, for the lower differential pressures, the piston 7 first compresses spring 22 and it continues to do so until there is contact between the piston member 7 and the flanges 20 and 21 of the spring holding member. The actual extent of movement is determined by the spaced distance $d_1$ existing between the inside face of piston 7 and the inwardly projecting flange 21 of the spring support member, as well as by the equivalent distance existing at the downstream end of wall section 8 and the inside face of groove 23 formed circumferentially in the outlet flange 20. Generally, the size of the spring 22 and its compressive resistance will be correlated with the low pressure set point of the unit so that as this distance $d_1$ is reduced to zero and there is beginning movement of the spring holding member 19, then the magnet 10 at the end of the interior core section 9 will have provided a magnetic field enveloping the zone of contact points 15 and 16 in a switch capsule 13, so as to effect the closing of such contacts and a signal showing that the pressure differential is within a desired specified range. This operation of course requires that the distance from the downstream end of the magnet 10 to the critical zone of the contact points 15 and 16 shall be substantially equivalent to distance $d_1$.

In the present unit the capsule 13 is shown extending axially into the housing from a support collar 14 threadedly mounted in the removable end section 2.

The contact points 15 and 16 in the capsule or reed switch 13 are normally open by virtue of cantilever spring support means provided for at least one of the contact points, but shall be capable of being forced into a closed contact position, upon the action of a suitable strength magnetic field around the capsule at the zone of the contact points. The encasement for switch capsule 13 shall normally be of glass, but may be of other non-magnetic material.

Where the differential pressure exerted against piston 7 increases after the initial contact of the piston member itself with the flanges of ring member 19, there is then caused the compression of the high range spring 24 which is supported between the inwardly projecting flange 21 and an adjustable, but normally fixed position, spring holding member 25. The latter being positioned within the interior down-stream end portion of the housing 1.

Figure 2:
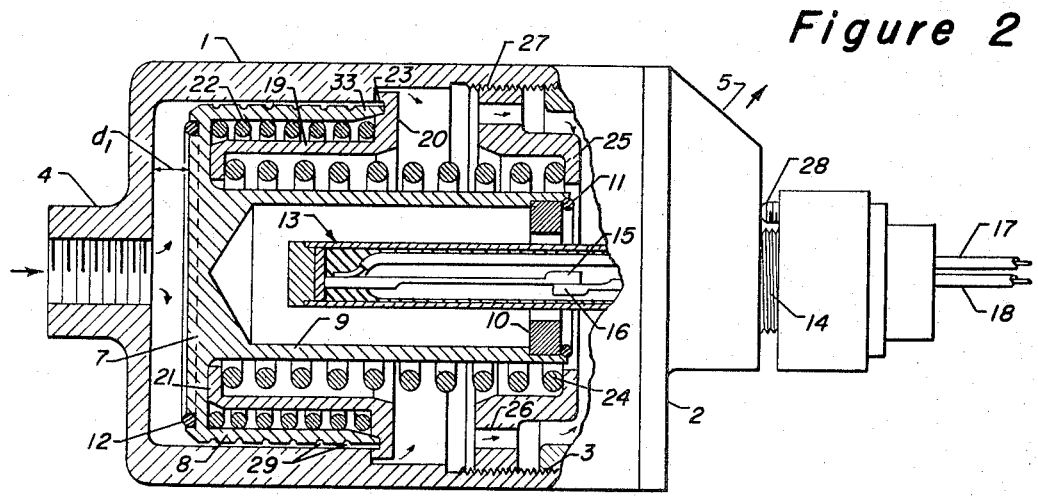

As best shown in FIGURE 2 of the drawing, when operation of unit being monitored is in a safe range there is compression of the spring 22 and an interlocking of piston wall section 8 into contact with the groove 23 in the flange portion of ring member 19. At the same time, there is shown the magnet 10 providing a magnetic field around contact points 15 and 16 such that they are pushed into contact with each other to provide the closing of the circuit connective with lead wires 17 and 18.

It may also be noted in connection with FIGURE 2 that the pressured fluid flow, connective with the switch unit at inlet 4, can flow around the piston wall 8, as well as the flange 20 of spring support member 19 and thence through the center of support member 25 and the holes 26 provided in a threaded flange portion 27 of such support member 25. The fluid can then flow through passageway 6 into outlet port 5.

In an operation where the presnure differential being monitored by the unit is excessive and causes the piston 7 to move together with spring support ring 19 a distance to effect substantial compression of spring member 24, whereby there is further travel the magnet 10 beyond the zone of the contact points 15 and 16, as best shown in FIGURE 3 of the drawing, then the electric circuit will be broken. It will be noted in FIGURE 3, that the contacts after losing the effect of the magnetic field therearound will again come to the normally open position. As previously indicated, the electrical circuit or signal means connecting with switch wires 17 and 18 may be such as to provide special signal or alarm means where there is an unsafe high differential pressure. Similarly, a signal shall also be given to shown an abnormal condition resulting from an excessively low pressure differential and the piston with its magnet 10 is upstream from the contact points 15 and 16, or in the substantial position of FIGURE 1 of the drawing, except that the piston 7 may be slightly raised from the end of the housing 1 and a minor amount of fluid flow existent through inlet port 4 and around the piston 1.

One advantageous feature of the present design and construction of the switch unit, is the provision for the longitudinal axial adjustment of the electromagnetic switch capsule 13, by virtue of the threaded mounting or engagement of collar 14 within the end housing section 2. In other words, a low pressure set point adjustment may be accomplished by turning the switch unit 13 further in or out of the housing 1 from the threaded support collar 14. After having found the desired setting or adjustment for the capsule 13 then there may be a fixing of its position by a suitable locking means, such as set screw 28 within a flanged portion of collar 14 to bear against end section 2.

In connection with the high pressure set point, it will be noted that the end spring support member 25, having the externally threaded flange section 27 is insertable within the end of the housing and can provide various longitudinal positionings within the downstream end of the unit to in turn provide variable spring loadings on the larger high pressure range spring 24.

A particularly preferred design feature of the present pressure switch unit, is the previously noted "floating piston" arrangement. Such featue is obtained by a helical groove 29 extending continuously around the outer wall section 8 of piston 7 from the upstream end thereof to the downstream end, whereby fluid pressure, as well as fluid flow may be provided circumferentially and uniformly around the entire piston wall. The helical groove 29 actually provides a controlled leakage path to supply lubricant for the piston movement and in addition it serves to help center the piston in the interior of the housing 1. The centering action is created by the continuous oil flow within the groove around the piston wall. In other words, as long as the piston is centered the flow path is substantially balanced within the housing, but when the piston begins to go off center then there is a restriction on one side thereof and fluid pressure begins to build up on the restricted side to in turn provide a self-balancing force to push the piston back to a more central position of the bore. In such instances as where there is a slight tilting action to the piston, the same balancing effect occurs so that the piston tends to be forced into a more central or balanced position with uniform flow circumferentially around the entire wall section 8.

Still another desirable construction feature of the present unit resides in the utilization of a tapered rim or edge 33 at the downstream end of piston wall 8 and the machining of the ring groove 23 in flange 20 such that the tapering wall portion of the rim 33 will effect an automatic alignment and self-centering of the intermediate ring support member 19, as the piston 7 comes into engagement therewith. This action, resulting in good alignment of the spring holding member, also prevents it from cocking and rubbing against any of the stationary surfaces of the piston member or of the inside wall of the housing 1.

It has previously been noted that suitable seal rings, such as 12 at the inlet end of the piston and O ring 11 in the downstream end of the core section 9, provide for sealing the fluid flow and preventing leakage through the unit in case of an emergency shut off, or of pressure failure, of the fluid medium coming into the pressure switch unit. In other words, in the event of a supply line failure the piston travel will be to the port opposite the failure by reason of the spring positioning and there is the sealing off of the outlet to prevent any further fluid loss. It should of course be recognized that other forms of gaskets or seal members may be provided in the present preferred form of unit; however, the O ring arrangement, as shown, provides relatively simplified means for providing satisfactory seals against adverse operating conditions. In order to provide a pressure type housing, it may be noted that the present embodiment also utilizes a seal ring 30 in an accompanying groove 31 of the removable end section 2, such that there is preclusion of any leakage between the two portions of the housing unit. There is also indicated a suitable seal ring 32 within the upstream portion of collar section 14 so that again, there is a pressure tight fitting between the latter and the removable end portion 2. The seal permits adjustability of the electromagnetic switch capsule 13 without having leakage of fluid therearound from high pressure conditions in the housing.

Where it is deemed desirable, housing 1 may be made in more than two sections and, of course, may employ suitable flanged connections between the separable parts, rather than threaded connection means as shown in the present embodiment. Further, it is not intended to limit the design or construction of the present improved switch unit to any one particular form of electromagnetic switch or relay, inasmuch as various suitable types of reeds or capsules are usually available, and have cantilever reed or spring mountings for the contact points, to in turn permit the desired magnetic action to in turn control the opening or closing of a particular circuit.

I claim as my invention:

1. A differential pressure switch providing an open circuit for pressures above and below a predetermined differential range, which comprises in combination,
    (a) a confined tubular form pressure tight housing with a fluid inlet at one end thereof and a fluid outlet from the opposing end portion thereof,
    (b) a movable piston member positioned in said housing in a manner having its solid transverse end portion adjacent the fluid inlet end of the housing, in addition said piston member having an outer peripheral wall section and a concentric spaced apart open inner core section,
    (c) a ring-shaped intermediate spring holding member that is longitudinally movable in a position between said outer wall section and said inner core section of said piston member,
    (d) said spring holding member having an outwardly projecting flange section providing support for a low pressure range compression spring positioned therebetween and the interior of said transverse end portion of said piston member,
    (e) said spring holding member also having an inwardly projecting flange section supporting a high pressure range spring therebetween and a downstream interior end portion of the housing,
    (f) a magnetically operable electrical switch capsule having overlapping normally open contact points, with at least one contact point spring supported, therein, and said switch capsule mounted within a central portion of said housing to extend into the interior of said inner core section of said movable piston member, and
    (g) a magnet member attached at the downstream open end portion of said inner core section to move adjacent the exterior wall of said encased electrical switch unit, whereby an electrical contact is made between the contact points of said switch unit from the field of said magnet as it travels adjacent the contact point zone from the corresponding movement of said piston and conversely, whereby the circuit of said switch unit is broken as said piston carrier the magnet both beyond and back away from the contact point zone of the switch resulting from both an increased pressure and from a decreased pressure on the piston member.

2. The differential pressure switch of claim 1 further characterized in that said piston member is provided with a helical groove that extends entirely around the wall section and from substantially one end to the other, whereby to permit a centering fluid flow for such piston member.

3. The differential pressure switch of claim 1 further characterized in that said switch capsule is supported by a threaded collar member which in turn extends through and threadedly engages an end section of said housing whereby said switch capsule is adjustable in its longitudinal position within said housing.

4. The differential pressure switch of claim 1 further characterized in that the downstream end portion of said housing has a removable end section and there is provided a separate threadedly mounted end spring support member for the downstream end of said high pressure range spring, whereby there may be a spring loading adjustment on such spring.

5. The differential pressure switch of claim 1 further characterized in that fluid seal rings are mounted within the opposing end portions of said piston member whereby there may be fluid flow stoppage through said housing from either direction responsive to a fluid flow failure.

References Cited

UNITED STATES PATENTS

| 2,934,628 | 4/1960 | Massar et al. | 200—142 |
| 2,985,732 | 5/1961 | Russell | 200—82 |
| 3,206,572 | 9/1965 | Buehler | 200—83 |
| 3,258,968 | 7/1966 | Woodcock | 73—308 |
| 3,271,708 | 9/1966 | McCormick | 335—205 |

BERNARD A. GILHEANY, *Primary Examiner.*

H. B. GILSON, *Assistant Examiner.*